(12) United States Patent
Molotchko et al.

(10) Patent No.: US 7,725,646 B2
(45) Date of Patent: May 25, 2010

(54) METHOD OF USING A FLASH MEMORY FOR A CIRCULAR BUFFER

(75) Inventors: Andrew Molotchko, Kanata (CA); Dave Graham, Kanata (CA); Joe Cote, Carleton Place (CA)

(73) Assignee: Alcatel Lucent, Paris (FR)

( * ) Notice: Subject to any disclaimer, the term of this patent is extended or adjusted under 35 U.S.C. 154(b) by 363 days.

(21) Appl. No.: 11/882,515

(22) Filed: Aug. 2, 2007

(65) Prior Publication Data

US 2009/0037646 A1 Feb. 5, 2009

(51) Int. Cl.
*G06F 12/00* (2006.01)
(52) U.S. Cl. ........................ 711/103; 711/156
(58) Field of Classification Search ................ 711/103, 711/156, 110; 710/52; 365/185.33
See application file for complete search history.

(56) References Cited

U.S. PATENT DOCUMENTS 5,832,493 A * 11/1998 Marshall et al. ............. 707/101

2005/0187988 A1* 8/2005 Fulton et al. ................. 707/202
2005/0262314 A1* 11/2005 Oh ............................. 711/154

OTHER PUBLICATIONS

Atmel, "AVR101: High Endurance EEPROM Storage", 5 pages, revision A, updated Sep. 2002.*
Koulouras et al., "Embedded Compact Flash", Jul.-Aug. 2005, Circuits and Devices Magazine, IEEE, vol. 21, Issue: 4, On pp. 27-34.*
Lim et al., "An Efficient NAND Flash File System for Flash Memory Storage", Jul. 2006, Computers, IEEE Transactions, vol. 55, Issue: 7, pp. 906-912.*
Gal et al., "Algorithms and Data Structures for Flash Memories", Jun. 2005, ACM Computing Surveys, vol. 37, No. 2, pp. 138-163.*

* cited by examiner

*Primary Examiner*—Brian R Peugh
*Assistant Examiner*—Sam Chen
(74) *Attorney, Agent, or Firm*—Kramer & Amado P.C.

(57) ABSTRACT

A method of using a FLASH memory for a circular buffer, and the FLASH memory for same, the method including one or more of the following steps in various exemplary embodiments: providing a circular buffer having a plurality of sectors; designating a byte of each of the plurality of sectors of the circular buffer as a binary state indicator; saving data sequentially in the circular buffer; and cycling through a plurality of sectors of the binary state indicators, such as empty or erase, last, middle and first, as the data is sequentially saved in the circular buffer.

9 Claims, 2 Drawing Sheets

METHOD OF USING A FLASH MEMORY FOR A CIRCULAR BUFFER

BACKGROUND OF THE INVENTION

1. Field of the Invention

This invention relates generally to a flash memory for a circular buffer.

2. Description of Related Art

One form of computer memory is non-volatile memory. An example of non-volatile memory is flash memory. One use of memory, including non-volatile memory such as flash memory, is to store log data. However, there is a need for a flash memory able to be used in a circular buffer.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for a flash memory for a circular buffer, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

Various exemplary embodiments are a method of using a FLASH memory for a circular buffer, including one or more of the following according to various combinations: providing a circular buffer having a plurality of sectors; designating a byte of data of each of the plurality of sectors of the circular buffer as a binary state indicator; setting the binary state indicator for each of the plurality of sectors to empty; setting the binary state indicator for a first of the plurality of sectors to last; writing data to the first of the plurality of sectors; setting the binary state indicator for a second of the plurality of sectors to last and setting the binary state indicator for the first of the plurality of sectors to first; writing data to the second of the plurality of sectors; setting the binary state indicator for the second of the plurality of sectors to middle and setting the binary state indicator for a third of the plurality of sectors to last; and writing data to the third of the plurality of binary sectors.

Various exemplary embodiments are methods of using a FLASH memory for a circular buffer, including one or more of the following according to various combinations: setting the binary state indicator for the third of the plurality of sectors to middle and the binary state indicator for the first of the plurality of sectors to erase and then last; setting the binary state indicator for the second of the plurality of sectors to first; and writing data to the first of the plurality of sectors a second time.

Various exemplary embodiments are a method of using a FLASH memory for a circular buffer, including one or more of the following: setting the binary state indicator for the first of the plurality of sectors to middle; setting the binary state indicator for the second of the plurality of sectors to erase and then last; setting the binary state indicator for the third of the plurality of sectors to first; and writing data to the second of the plurality of sectors a second time.

Various exemplary embodiments are a method of using a FLASH memory for a circular buffer, including one or more of the following according to various combinations: the binary state indicators comprise 8 bits of data of FLASH memory; the erase binary state indicator corresponds to a binary number FF; the binary state indicator indicating the last sector corresponds to a binary number FA; the binary state indicator indicating the middle sector corresponds to a binary number F0; and the binary state indicator indicating the first sector corresponds to a binary number A0.

Various exemplary embodiments are a method of using a FLASH memory for a circular buffer, including one or more of the following according to various combinations: providing a plurality of sectors of FLASH memory in a circular buffer; designating one byte of data of each of the plurality of sectors of FLASH memory in the circular buffer as a binary state indicator; saving data sequentially in the circular buffer; and cycling through a plurality of sectors of the binary state indicators as the data is sequentially saved in the circular buffer.

Various exemplary embodiments are a FLASH memory for use in a circular buffer and implementing any of the embodiments of the method. Thus, various exemplary embodiments include a plurality of sectors of FLASH memory, each sector of FLASH memory including a predetermined number of bits designated as a binary state indicator, wherein the binary state indicators transition through a plurality of states in connection with an operation of the circular buffer.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
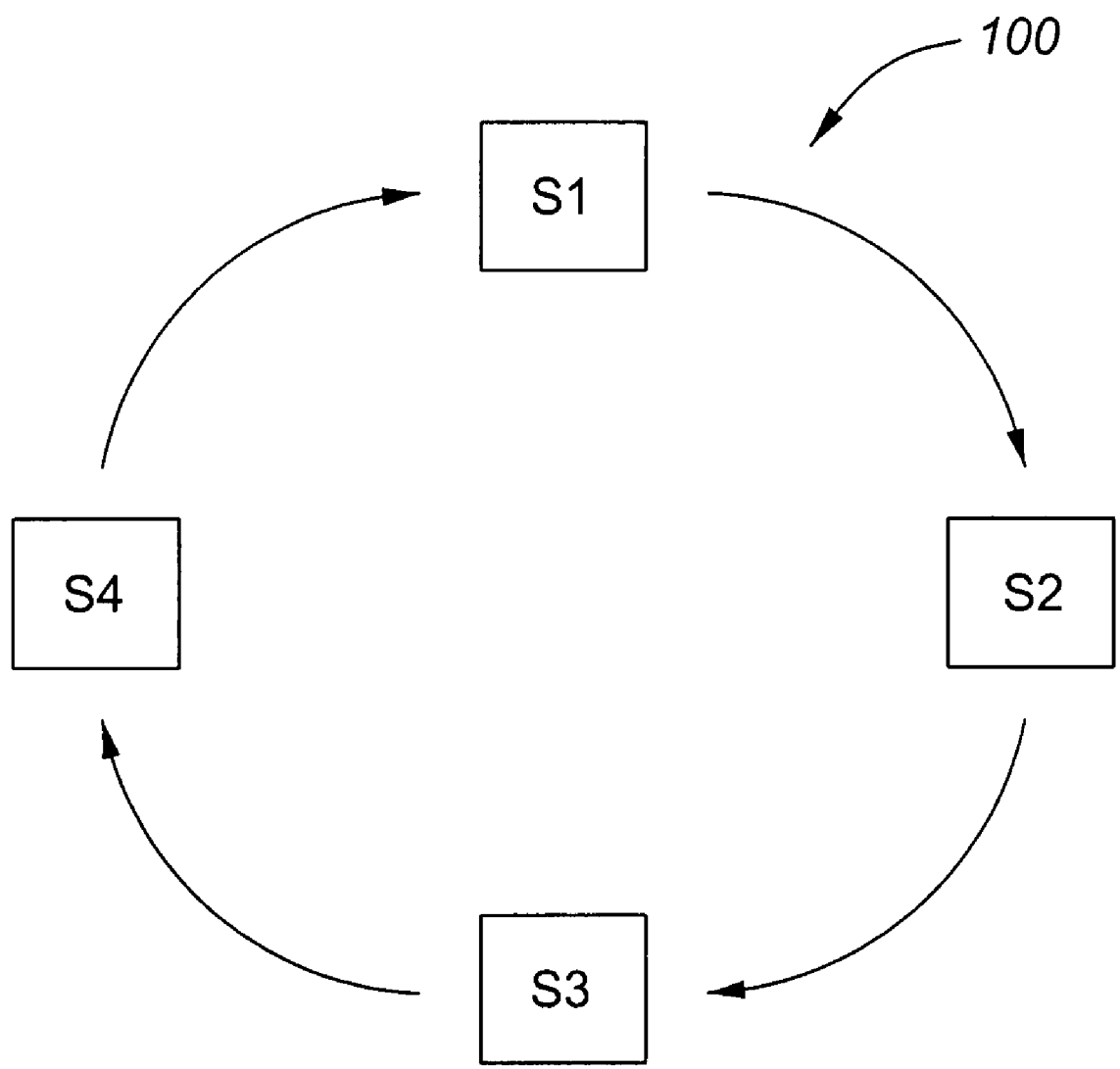
FIG. 1 is a schematic diagram of an exemplary embodiment of a circular buffer.

A need exists for a reliable and efficient approach to storing line card data log information. Line card data log information includes, but is not limited to, start up information, hardware revision numbers, software revision numbers, especially for software downloaded through the Internet, diagnostic failure information, and so on.

In other words, there is a need for a reliable and efficient approach to storing any information that is useful for a root cause analysis on returned line cards. Some embodiments of line cards have stored fixed sized records of logged data in a circular log buffer. Some embodiments of such circular log buffers include eight 64 KB sectors of 512 KB FLASH memory. However, a problem with such embodiments is that the implementation of fixed sized records is a waste of memory space. This is true because log data records are variable in length. The length of log data records depends on the type of data being logged.

Thus, efficient use of FLASH memory for data logging is advantageous. This is true because the FLASH memory is often used for other purposes on the line card. For example, some embodiments of a line card use FLASH memory for boot software.

Additionally, in many implementations, a line card is in a system for an extended period of time and logs a significant amount of data before it becomes necessary to read back the logged data. Thus, it is believed to be important that a given size circular buffer stores as much log data as possible.

A typical FLASH memory can only be written to once. Afterwards, a typical FLASH memory must be erased and re-initialized before it can be written to again. This property of FLASH memory makes FLASH memory problematic in data logging applications.

Further, typically, the minimum unit of FLASH memory that can be erased is a sector of memory. Typically, the erasure of memory constitutes the resetting of bits in the memory to binary 1s. In other words, when a bit of FLASH memory is written to by setting it to 0 the entire sector of memory to which that bit of memory belongs must be erased in order set any particular bit to a 1 again.

In order to overcome the forgoing problems, various exemplary embodiments create a circular buffer for data logging that uses fixed size sectors of FLASH memory. In various exemplary embodiments, the record length is variable. In various exemplary embodiments, the record length is written in a length, value (LV) format. In various exemplary embodiments, the first byte in each sector of memory indicates a status of the sector in the circular buffer.

In various exemplary embodiments, the status of each sector in a circular buffer is one of four possibilities. The four possibilities include empty or erase (E), last (L), middle (M) and first (F). Using the forgoing status indicators in each sector of memory in a circular buffer, the head and tail of the circular buffer may easily identified.

The easy identification of the head and tail of a circular buffer enable easier data retrieval from that circular buffer. Further, an easy identification of the head and tail in a circular buffer enables the resuming of data logging at a correct location in the circular buffer in the case of a line card re-boot. Based on the foregoing, various exemplary embodiments efficiently overcome limitations associated with the unique properties of a FLASH memory that limit the FLASH memory to writing once and then resetting, re-initializing, or erasing.

Referring now to the drawings, in which like numerals refer to like components or steps, there are disclosed broad aspects of various exemplary embodiments.

FIG. 1 is a schematic diagram of an exemplary embodiment of a circular buffer 100. The exemplary circular buffer 100 includes four sectors.

The first sector of exemplary circular buffer 100 is S1. The second sector of exemplary circular buffer 100 is S2. The third sector of exemplary circular buffer 100 is S3. The fourth sector of exemplary circular buffer 100 is S4.

The circular buffer 100 proceeds in a circular manner through its four sectors from S1 to S2 to S3 to S4 and back to S1. This is indicated by the arrows in FIG. 1.

It should be apparent that various exemplary embodiments are implemented in circular buffers having any number of sectors. Exemplary circular buffer 100 is depicted in order to illustrate the concepts as implemented in various exemplary embodiments having a circular buffer size of more or less than four sectors. This will be described in greater detail below.

Figure 2:
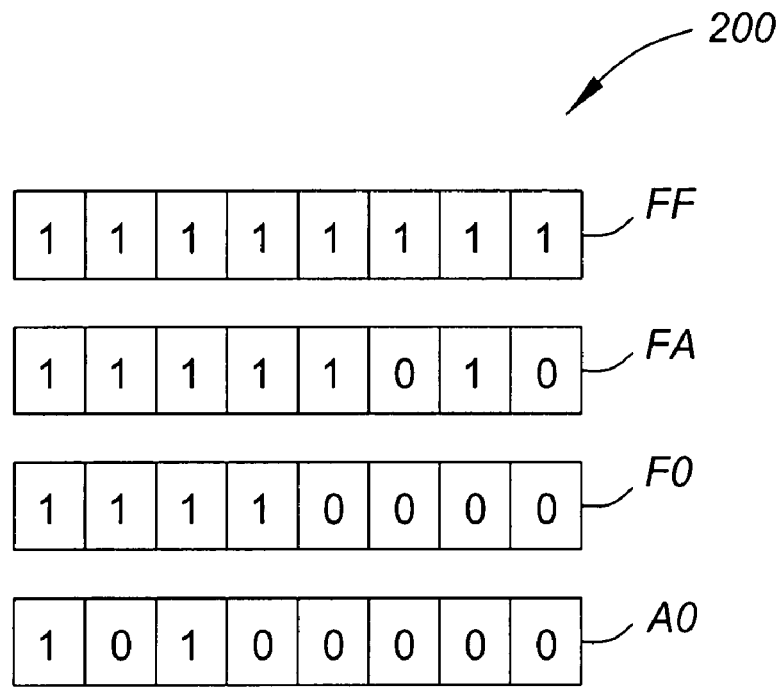
FIG. 2 is a schematic diagram of exemplary binary state indicators.

FIG. 2 is a schematic diagram 200 including exemplary binary state indicators. Each binary state indicator consists of eight bits. When a FLASH memory is erased or re-initialized, and all of its bits are set to 1, this is indicated by binary state indicator FF and corresponds to the empty (E) state.

After the empty (E) state, in various exemplary embodiments, the sixth and eight bits of the 8 bit binary state indicator are written to the zero value. This corresponds to binary state indicator FA and is used in various exemplary embodiments to represent the last (L) state.

Following the last (L) state, in various exemplary embodiments, the fifth and seventh bits of the 8 bits in the binary state indicator are written to zero. This corresponds to binary state F0 or the middle (M) state.

Following the middle (M) state, in various exemplary embodiments, the second and fourth bits of the 8 bit binary state indicator are written to the zero value. This corresponds to binary state indicator A0 or the first (F) state.

Following the first (F) state, the binary state indicator is erased or re-initialized so that all of its bits are reset to 1 values. This corresponds to binary state indicator FF, the empty (E) state. In various exemplary embodiments, when new logged data exists for writing to the circular buffer 100, and not enough free space is available in the various sectors of the circular buffer 100, then the sector having a binary state indicator marked as first (F) is erased to create more free space. In various exemplary embodiments, when reading logged data, the reading of the data begins in the circular buffer 100 at the sector having the binary state indicator marked first (F) and continues until reaching the sector in the circular buffer 100 having a binary state indicator marked as last (L).

The L state indicates the last or most recent sector to be written to in the circular buffer. The F state corresponds to the first or least recent sector written to in the circular buffer. The M state corresponds to a middle sector in the circular buffer between the L state and the F state. Thus, it should be apparent that a circular buffer containing more than four sectors will have more than one sector identified as in a middle state once the entire circular buffer has been used. Also, in various exemplary embodiments where a circular buffer contains only two sectors, in various exemplary embodiments that circular buffer contains only a first and last sectors, and no middle sectors.

The E state is a state wherein all the data is erased. That is, all the bits in the sector are 1s. The E state represents a transitory state that occurs before a binary state indicator is put in the L state.

Based on the foregoing, and with reference to FIG. 1, a sequence of state changes in an exemplary circular buffer 100 is as follows. Initially, S1, S2, S3 and S4 are all in the E state.

Data is then written to S1 and the state of S1 is set to L. Then, data is written to S2, S1 is full, S2 is set to L, and S1 is set to F.

Next, data is written to S3, S2 is full, S2 is set to M, and S3 is set to L. Then, data is written to S4, S3 is full, S3 is set to M, and S4 is set to L.

Then, data is written to S1, S4 is full, S4 is set to M, S1 is set to E and then L, and S2 is set to F. Next, data is written to S3, S2 is full, S2 is set to M, S3 is set to E and then L, and S4 is set to F.

Subsequently, the sequence of state changes continues in the manner described above. It should be apparent, the exemplary embodiment of state changes according to the sequence described above can be varied to apply to circular buffers having fewer or greater than four sectors.

Figure 3:
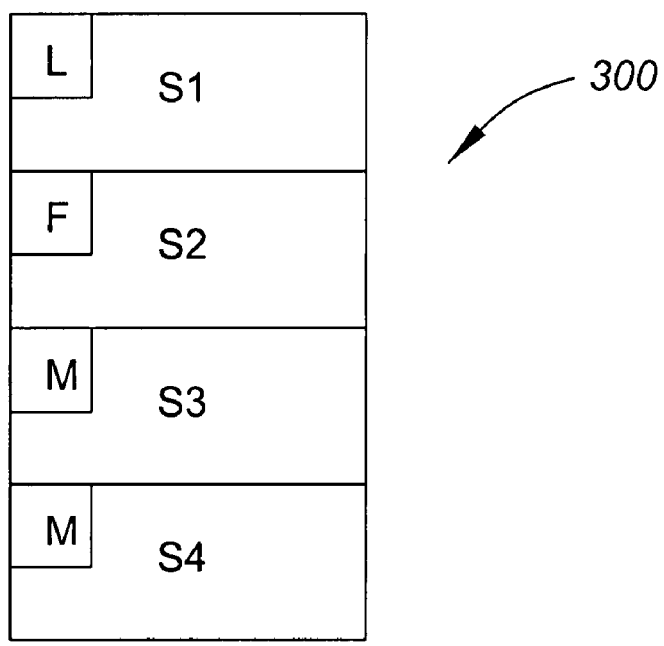
FIG. 3 is a schematic diagram of an exemplary embodiment of a flash memory for a circular buffer.

FIG. 3 is a schematic diagram of an exemplary embodiment of a flash memory for a circular buffer 300. Sector S1 is depicted having its binary state indicator set to L. Sector S2 is indicated having its binary state indicator set to F. Sector S3 is indicated having its binary state indicator set to M. Sector S4 is indicated also with its binary state indicator set to M.

Thus, the binary state indicators described in connection with FIG. 2 are indicated in the upper left hand corner of each of the four sectors of FLASH memory depicted in exemplary FLASH memory for a circular buffer 300. Buffers with more than four sectors would have more than two sectors in the M state.

The sequence of binary state indicators described above in connection in FIG. 2 enables various exemplary embodiments incorporating FLASH memory to transition through the states of L, M and F before being erased in state E to be set in the L state again. In various exemplary embodiments, the L state denotes the head of the circular buffer. In various exemplary embodiments, the F state denotes the tail of circular buffer.

According to the foregoing, in various exemplary embodiments, once the entire circular buffer is full in all states, the next sector to be written to, that is, the sector currently in the F state, is erased, which places it in the E state, and then set to the L state before data is written to that sector. Subsequently, the next sector is then set to the F state and the sector that was previously in the L state is set to the M state.

An exemplary implementation of a sequence of states was described above in connection with FIG. 1. In various exemplary embodiments, where the act of erasing or re-initializing a flash memory constitutes the setting of all bits in the memory to 0s, then the sequence of exemplary binary states described above is reversed. Otherwise, the subject matter described above operates in various exemplary embodiments in essentially the same manner where a FLASH memory is erased or re-initialized by setting all bits to 0s.

According to the forgoing, various exemplary embodiments enable reusing FLASH memory in a circular buffer. Thus, various exemplary embodiments enable memory usage to increase 10 to 20 times or more. Accordingly, various exemplary embodiments enable the use of a non-volatile memory such as a FLASH memory for logging data.

Accordingly, various exemplary embodiments are widely applicable to uses in electronic systems. For example, various exemplary embodiments enable the recovery of a file system when a card is restarted. Broadly put, various exemplary embodiments enable a more efficient use of FLASH memory as compared to embodiments that use fixed record sizes for data logging.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method of using a FLASH memory for a circular buffer, comprising:
providing a circular buffer having a plurality of separately erasable sectors;
designating one multi-bit data within each of the plurality of sectors of the circular buffer as a binary state indicator, settable to an empty state value indicating the sector is empty, and to a state value indicating a position of the sector in the circular buffer;
setting the binary state indicator in each of the plurality of sectors to the empty state value by erasing each of the plurality of sectors;
setting the binary state indicator in a first of the plurality of sectors to a value indicating the first sector being the last sector in the circular buffer;
writing data to the first of the plurality of sectors;
setting the binary state indicator in a second of the plurality of sectors to the last sector value and setting the binary state indicator in the first of the plurality of sectors to a value indicating the first sector being the first sector in the circular buffer;
writing data to the second of the plurality of sectors;
setting the binary state indicator in the second of the plurality of sectors to a value indicating the second sector being a middle sector in the circular buffer and setting the binary state indicator in a third of the plurality of sectors to a value indicating the third sector being the last sector in the circular buffer; and
writing data to the third of the plurality of binary sectors.

2. The method of claim 1, further comprising:
setting the binary state indicator in the third of the plurality of sectors to a value indicating the third sector being a middle sector in the circular buffer;
setting the binary state indicator in the first of the plurality of sectors to the empty state value by erasing said first sector and then setting said binary state indicator to a value indicating the first sector being the last sector in the circular buffer;
setting the binary state indicator for the second of the plurality of sectors to a value indicating the first sector being the first sector in the circular buffer; and
performing another writing of data to the first of the plurality of sectors.

3. The method of claim 2, further comprising:
setting the binary state indicator in the first of the plurality of sectors to a value indicating the first sector being a middle sector in the circular buffer;
setting the binary state indicator in the second of the plurality of sectors to the empty state value by erasing said second sector and then setting said binary state indicator to a value indicating the second sector being the last sector in the circular buffer;
setting the binary state indicator in the third of the plurality of sectors to a value indicating the first sector being the first sector in the circular buffer; and
performing another writing of data to the second of the plurality of sectors.

4. The method of claim 1, wherein each of the binary state indicators comprises eight bits of data of the FLASH memory sector corresponding to the binary state indicator.

5. The method of claim 4, wherein the empty state value corresponds to a binary number represented in hexadecimal form as FF.

6. The method of claim 5, wherein the binary state indicator value indicating the sector being the last sector in the circular buffer corresponds to a binary number represented in hexadecimal form as FA.

7. The method of claim 5, wherein the binary state indicator value indicating the sector being a middle sector in the circular buffer corresponds to a binary number represented in hexadecimal form as F0.

8. The method of claim 5, wherein the binary state indicator value indicating the sector being the first sector in the circular buffer corresponds to a binary number represented in hexadecimal form as A0.

9. A method of controlling a FLASH memory having a plurality of separately erasable sectors to form a circular buffer, each sector storing a plurality of multi-bit data, comprising:
- a) setting a sector state indicator in at least one of the sectors to an empty state value indicating the corresponding sector as empty by erasing said at least one sector;
- b) designating one of the sectors having its sector state indicator at an empty state value to be a current last sector in the circular buffer by setting the sector state indicator of said one of the sectors to a last sector indicator value;
- c) writing data to the current last sector of the circular buffer, wherein said writing removes the empty state value of the sector state indicator of the current last sector;
- d) designating another of the sectors having its sector state indicator at an empty state value to be the current last sector in the circular buffer and designating the previous last sector of the circular buffer to be a current first sector of the circular buffer, by setting the sector state indicator of said another sector to said last sector indicator value and setting the sector state indicator of the previous last sector to a first sector indicator value;
- e) writing data to the current last sector of the circular buffer, wherein said writing removes the empty state value of the sector state indicator of the current last sector;
- f) designating another of the sectors having its sector state indicator at an empty state value to be the current last sector in the circular buffer and designating the previous last sector of the circular buffer to be a current middle sector of the circular buffer, by setting the sector state indicator of said another sector to said last sector indicator value and setting the sector state indicator of the previous last sector to a middle sector indicator value;
- g) writing data to the current last sector of the circular buffer, wherein said writing removes the empty state value of the sector state indicator of the current last sector;
- h) repeating steps (f) and (g) until no sector has its sector state indicator at an empty state value;
- i) setting the sector state indicator of the current first sector of the circular buffer to the empty state value by erasing the current first sector; and
- j) designating the current first sector of the circular buffer to be the current last sector by setting the sector state indicator of the first sector to the last sector indicator value, and designating the previous last sector to be the current first sector by setting the sector state indicator of the previous last sector to the first sector indicator value.

* * * * *